(12) United States Patent
Litch et al.

(10) Patent No.: US 9,164,936 B2
(45) Date of Patent: Oct. 20, 2015

(54) SYSTEM AND METHOD FOR REGULATING DIRECT MEMORY ACCESS DESCRIPTOR AMONG MULTIPLE EXECUTION PATHS BY USING A LINK TO DEFINE ORDER OF EXECUTIONS

(71) Applicant: Silicon Laboratories Inc., Austin, TX (US)

(72) Inventors: Timothy E. Litch, Dripping Springs, TX (US); Paul I. Zavalney, Austin, TX (US)

(73) Assignee: SILICON LABORATORIES INC., Austin, TX (US)

( * ) Notice: Subject to any disclaimer, the term of this patent is extended or adjusted under 35 U.S.C. 154(b) by 72 days.

(21) Appl. No.: 13/731,278

(22) Filed: Dec. 31, 2012

(65) Prior Publication Data

US 2014/0189169 A1    Jul. 3, 2014

(51) Int. Cl.
*G06F 13/00* (2006.01)
*G06F 13/28* (2006.01)

(52) U.S. Cl.
CPC .................................... *G06F 13/28* (2013.01)

(58) Field of Classification Search
CPC ....................................................... G06F 13/28
USPC ................ 710/22–24; 711/125; 712/205, 207
See application file for complete search history.

(56) References Cited

U.S. PATENT DOCUMENTS

| | | | |
|---|---|---|---|
| 5,953,512 A * | 9/1999 | Cai et al. ........................ | 712/205 |
| 7,428,603 B2 * | 9/2008 | Henson et al. .................. | 710/22 |
| 7,680,962 B2 * | 3/2010 | Anjo et al. ...................... | 710/22 |
| 2005/0138233 A1 * | 6/2005 | Bibikar et al. .................. | 710/24 |
| 2005/0223172 A1 * | 10/2005 | Bortfeld ........................ | 711/125 |
| 2008/0140995 A1 * | 6/2008 | Fukazawa ..................... | 712/205 |

* cited by examiner

*Primary Examiner* — Tammara Peyton
(74) *Attorney, Agent, or Firm* — Trop, Pruner & Hu, P.C.

(57) ABSTRACT

An apparatus includes an integrated circuit that includes a processing core and a direct memory access (DMA) engine. The DMA engine is adapted to process descriptors to control DMA communications. The descriptors contain data indicating communication endpoints that are associated with the DMA communications. The DMA engine is adapted to use other data contained in at least one of the descriptors to control branching of descriptor execution among multiple execution paths.

18 Claims, 5 Drawing Sheets

SYSTEM AND METHOD FOR REGULATING DIRECT MEMORY ACCESS DESCRIPTOR AMONG MULTIPLE EXECUTION PATHS BY USING A LINK TO DEFINE ORDER OF EXECUTIONS

BACKGROUND

One way to communicate data between a system memory and a peripheral component of a computer system is for a central processing unit (CPU) to serve as an intermediary for the communication. For example, to transfer data from the system memory to the peripheral component, the CPU may perform the transfer by initiating the appropriate read operations to retrieve the data from the system memory and initiating the appropriate write operations to store the retrieved data in the memory of the peripheral component. For purposes of reducing CPU overhead, the computer system may employ direct memory access (DMA) in which a DMA engine of the peripheral component directly accesses the system memory to transfer the data. The CPU typically programs the DMA engine to set up the parameters for the transfer, such as the source and destination addresses and the number of bytes to transfer.

SUMMARY

In an example embodiment, a technique includes using execution of descriptors to control direct memory access (DMA) communications and using data from at least one of the descriptors to control branching of descriptor execution among multiple execution paths.

In another example embodiment, an apparatus includes a memory to store descriptors to control direct memory access (DMA) communications. The apparatus includes a control circuit to use data in at least one of the descriptors to control branching of descriptor execution among multiple execution paths.

In another example embodiment, an apparatus includes an integrated circuit that includes a processing core and a direct memory access (DMA) engine. The DMA engine is adapted to process descriptors to control DMA communications. The descriptors contain data indicating communication endpoints associated with the DMA communications. The DMA engine is adapted to use other data contained in at least one of the descriptors to control branching of descriptor execution among multiple execution paths.

Advantages and other desired features will become apparent from the following drawings, description and claims.

DETAILED DESCRIPTION

One way to set up a given direct memory access (DMA) transfer (or "cycle") is for a central processing unit (CPU) to program registers of a peripheral component's DMA engine with the parameters for the transfer, such as the source and target address, the size of the data being transferred and the strides associated with the transfer. Another way to set up a DMA transfer is for the CPU to sore the parameters in a memory data structure called a "DMA descriptor."

A DMA descriptor, in general, is a data structure that is processed, or executed, by a DMA engine for purposes of programming parameters into the DMA engine for an associated DMA transfer. A given DMA descriptor may further direct, or link, the DMA engine to the next DMA descriptor to be processed by the DMA engine so that a set of DMA descriptors may be linked together to form a particular DMA descriptor execution flow, or path. A particular advantage of DMA descriptors, as compared to register programming, is that multiple, linked DMA descriptors may be set up in memory to program a corresponding sequence of DMA transfers.

Techniques and systems are disclosed herein to use information contained in DMA descriptors to impart branching decision logic (IF-THEN-ELSE logic, for example) to allow the DMA engine to select between multiple potential DMA descriptor execution paths, thereby further potentially reducing CPU involvement. For example, using the DMA descriptor information disclosed herein, the DMA engine, after executing a given DMA descriptor and evaluating a potential branching condition, may select between continuing a "loop" of repeating DMA transfers controlled by a corresponding sequence of DMA descriptors; abort the loop and transition to an idle state; or abort the loop and proceed with alternate DMA transfers controlled by another sequence of DMA descriptors. In other words, the DMA engine may, for example, evaluate a conditional value at the end of a loop (IF conditional value equals "x"), execute another set of DMA transfers (IF conditional value equals "x" THEN execute the other descriptors) or terminate the DMA descriptor loop and transition to an idle state (ELSE go idle).

Allowing branching decisions to be made in the DMA descriptor execution flow may be particularly advantageous for reducing CPU overhead, as the CPU may otherwise be involved in application execution, or may be powered-down in an idle state. For example, a given sequence of DMA descriptors may define a sequence of DMA transfers that repeat for a certain number of times for purposes transferring data from a wireless interface of a packet radio. The branching decisions allow transition between one sequence of repeating DMA transfers that execute in a loop and another sequence of DMA transfers that, for example, prepare the packet radio to enter a reduced power consumption state, all without using the CPU to set up this other sequence of DMA transfers.

Figure 1:
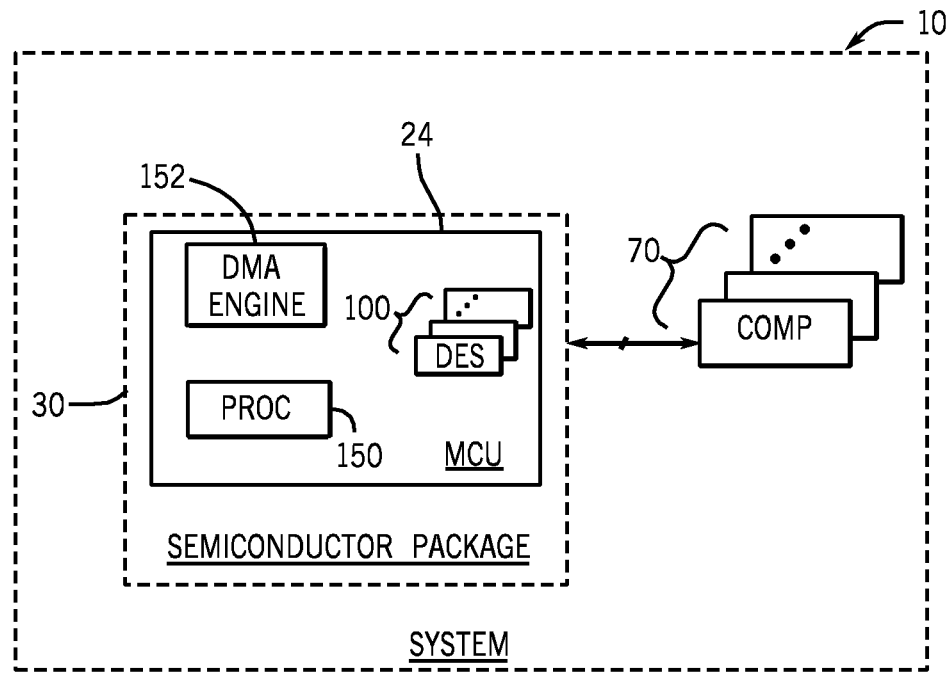
FIGS. 1 and 7 are schematic diagrams of microcontroller unit (MCU)-based systems according to an example embodiment.

As a more specific example, FIG. 1 depicts an MCU 24 in an example system 10. For this example, the MCU 24 controls various aspects of one or multiple components 70 in response to communications with the component(s) 70. As examples, the components 70 may include one of more of the following depending on the particular application: an electrical motor, a household appliance, an inventory control terminal, a computer, a tablet, a smart power meter, a wireless interface, a cellular interface, an interactive touch screen user interface and so forth. All or part of the components of the MCU 24 may be part of an integrated circuit (IC), or semiconductor package 30.

As depicted in FIG. 1, the MCU 24, in accordance with example embodiments, includes a DMA engine 152, which may be part of a peripheral component (a network interface, a wireless interface, a general purpose input/output (GPIO) interface, and so forth) of the MCU 24. The DMA engine 152 executes DMA descriptors for purposes of setting up and initiating corresponding DMA transfers within the MCU 24. A given DMA transfer may be, as examples, a transfer from a memory of the peripheral component containing the DMA engine 152 to a system memory of the MCU 24; a transfer from the system memory to the memory of the peripheral component; a transfer between system memory locations; or a peripheral-to-peripheral transfer.

Figure 2:
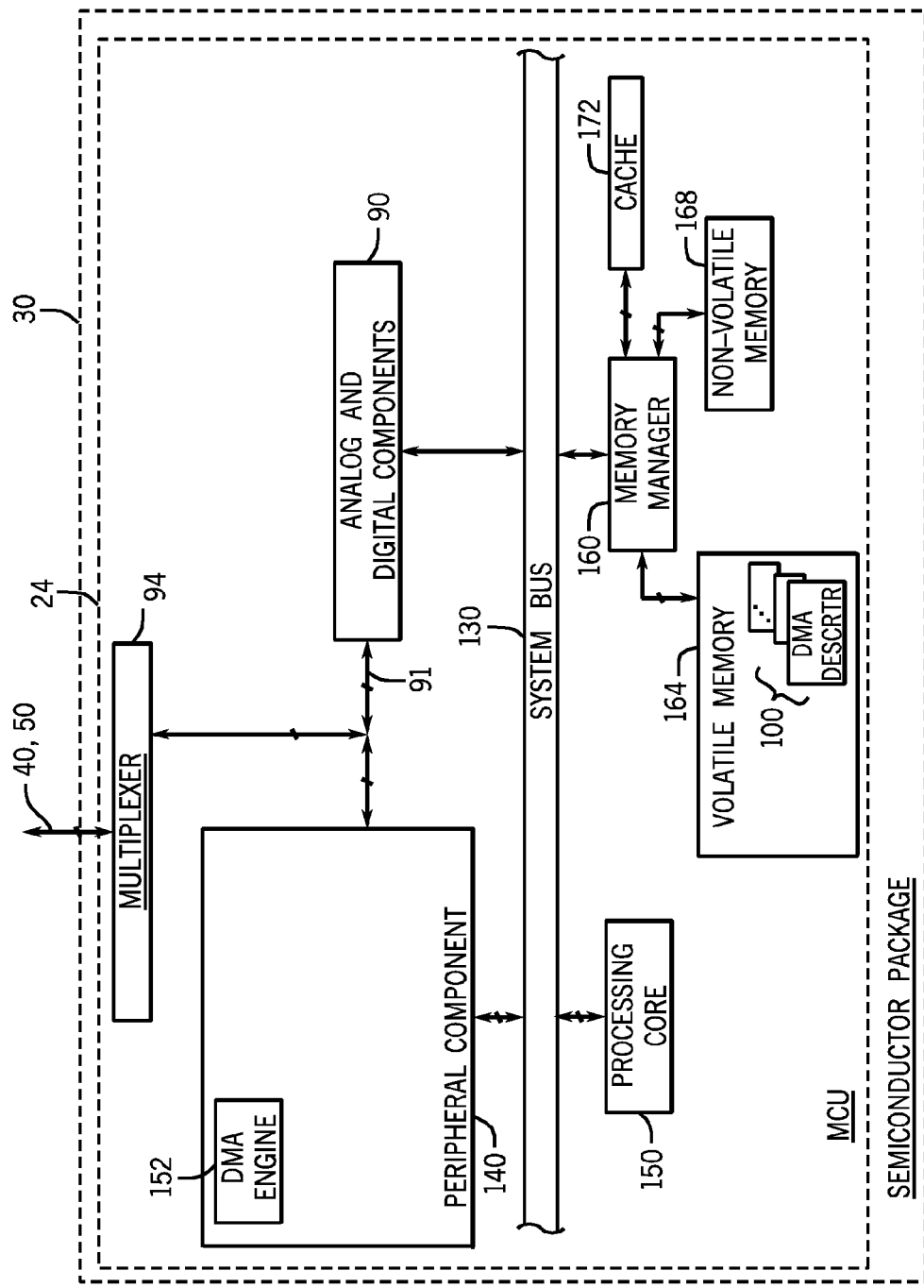
FIG. 2 is a schematic diagram of an MCU of the system of FIG. 1 according to an example embodiment.

Referring to FIG. 2, in accordance with some embodiments, all or part of the components of the MCU 24 may be part of the integrated circuit (IC) 30. As examples, all or part of the components of the MCU 24 may be fabricated on a single die or on multiple dies.

Among its components, the MCU 24 includes a processing core 150 and an exemplary peripheral component 140 that contains the DMA engine 152. Depending on the particular embodiment, the MCU 24 may not contain any of the components depicted in FIG. 2 other than the processing core 150 and peripheral component 140; may contain one or more of the components that are depicted in FIG. 2 in addition to the processing core 150 and the peripheral component 140; may contain other and/or additional components than the components that are depicted in FIG. 2; and so forth. Thus, many embodiments are contemplated, which are within the scope of the appended claims.

As an example, the processing core 150 may be a 32-bit core, such as the Advanced RISC Machine (ARM) processing core, which executes a Reduced Instruction Set Computer (RISC) instruction set. In general, the processing core 150 communicates with various other system components of the MCU 24, such as a memory controller, or manager 160, over a system bus 130. In general, the memory manager 160 controls access to various memory components of the MCU 24, such as a cache 172, a non-volatile memory 168 (a Flash memory, for example) and a volatile memory 164 (a static random access memory (SRAM), for example).

It is noted that FIG. 2 depicts a simplified representation of the MCU architecture, as the MCU 24 may have many other components, bridges, buses, and so forth, in accordance with further embodiments, which are not depicted in FIG. 2. For example, in accordance with some embodiments, the MCU 24 may have a bus matrix module that implements slave side arbitration and is used to regulate access to the memory devices of the MCU 24.

In accordance with some embodiments, the MCU 24 includes analog and digital components 90, which communicate analog and digital signals with I/O terminals 90. The analog components may include various components that receive analog signals, such as analog-to-digital converters (ADCs) and comparators; and the MCU 24 may contain analog components that provide analog signals, such as current drivers.

The digital components of the MCU 24 may communicate with the processing core 150 over the system bus 130. As examples, the digital components may include a Universal Serial Bus (USB) interface, a universal asynchronous receiver/transmitter (UART), a system management bus interface (SMB), a serial peripheral interface (SPI), and so forth. In general, these digital components communicate with devices that are external to the MCU 24 via I/O terminals 91. In accordance with example embodiments, the MCU 24 includes a multiplexer 94 for purposes of programmably assigning terminals of the analog and digital components 90 to the I/O terminals 40 and 50 of the MCU 24.

As depicted in FIG. 2, in accordance with some embodiments, the pending DMA descriptors 100 may be stored in the volatile memory 164. In accordance with example embodiments, the DMA engine 152 may transfer one or more of these pending DMA descriptors 100 into a memory of the engine 152 for execution. It is noted that the DMA engine 152 may retrieve the DMA descriptors 100 from the volatile memory 164, although the processing core 150 may retrieve the DMA descriptors 150 from the volatile memory 164 and store the DMA descriptors 100 in the DMA engine's memory, in accordance with further embodiments.

Figure 3:
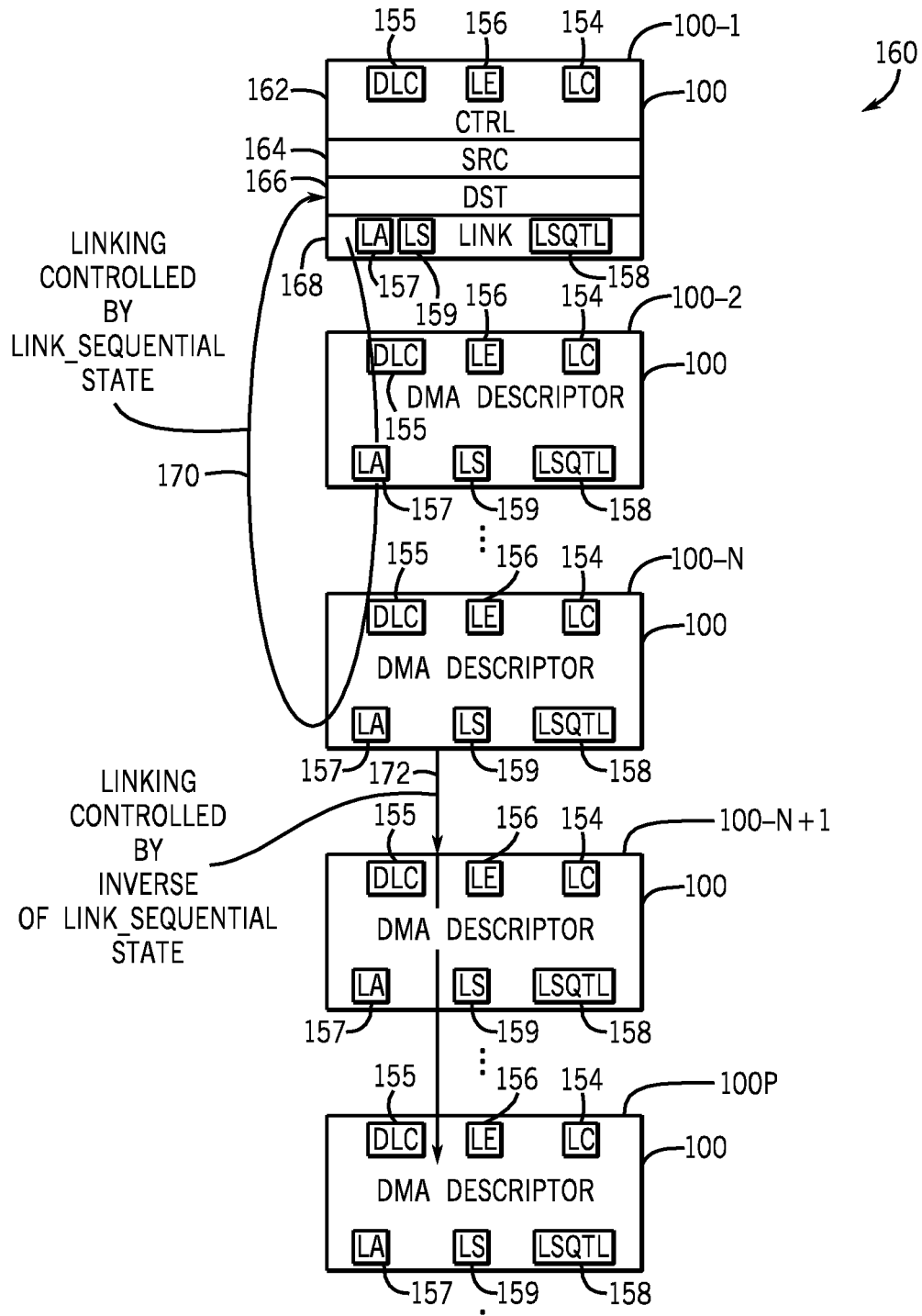
FIGS. 3 and 6 are illustrations of the use of direct memory access (DMA) descriptors to control branching among multiple DMA descriptor execution paths according to example embodiments.

Referring to FIG. 3 in conjunction with FIG. 2, in accordance with an example embodiment, the DMA engine 152 executes the DMA descriptors 100 in a sequence that is depicted by an execution flow 160 in FIG. 3. For this specific example, the execution flow 160 includes two DMA descriptor execution paths: a first DMA descriptor execution path 170 defining an execution sequence of N DMA descriptors 100 (DMA descriptors 100-1, 100-2 . . . 100-N being depicted as examples in FIG. 3); and a second, or alternate, DMA descriptor execution path 172 (example DMA descriptors 100-N+1 . . . 100P, being depicted as examples in FIG. 3). In this manner, for the specific example disclosed herein, the DMA engine 152 first repeatedly performs a set of DMA transfers corresponding to execution of the DMA descriptors 100-1 to 100-N and the DMA descriptor execution path 170.

The DMA engine 152 terminates processing of the DMA descriptors corresponding to the DMA descriptor execution path 170 and begins processing DMA descriptors 100-N+1 to 100-P corresponding to the DMA execution flow path 172 when an end loop condition is satisfied. More specifically, in accordance with an example embodiment, due to information contained in the DMA descriptor 100-N, each time that the DMA engine 152 processes the DMA descriptor 100-N, the DMA engine 152 evaluates an IF-THEN-ELSE conditional branching decision based on a conditional value. For example, this conditional value may be a number of times that the DMA engine 152 has repeated the DMA descriptor execution path 170, and the decision may involve the DMA engine 152 testing this number to determine if the number surpasses a programmed threshold. If not, the DMA engine 152 processes the DMA descriptor 100-N in another iteration of the loop. Otherwise, the DMA engine 152 may, for example, transition to an idle state or process the DMA descriptor 100-N+1 to transition to the DMA descriptor execution path 172.

In accordance with example embodiments, as depicted by example DMA descriptor 100-1 in FIG. 3, in general, the descriptor 100 contains four fields (four one word fields, as an example) to specify the parameters for an associated DMA transfer and control which DMA descriptor 100, if any, is processed next: a control field 162, which contains data representing one or more commands for the DMA transfer; a source field 164, which contains data to specify a source address for the DMA transfer; a destination field 166, which contains data to specify a destination address for the DMA transfer; and a link field 168, which contains data to, in general, to control whether sequential or non-sequential linking to the next DMA descriptor 100 is used. As described below, in accordance with an example embodiment, the control 162 and link 166 fields contain data that regulates conditional branching and looping decisions that are made by the DMA engine 152.

As a more specific example, in accordance with an example embodiment, the control field 162 may contain data specifying the following parameters for purposes of regulating the conditional branching and looping decisions that are made by the DMA engine 152. A loop counter parameter 154 specifies a loop count value (called "LOOP_CNT[7:0]" herein) and is used by the DMA engine 152 to track the number of iterations for which the DMA transfer associated with the DMA descriptor 100 is executed, assuming that a loop enable parameter 156 (having a value called "LE") allows looping to occur. If looping is permitted (LE=EN), the DMA engine 152 may, for example, decrement the LOOP_CNT[7:0] count value to track the number of times a repeated set, or loop, of DMA descriptors 100 are processed by the DMA engine 152 before the execution flow exits the loop. Thus, the LOOP_CNT[7:0] value represents a potential conditional value that the DMA engine 152 may test for purposes of making a branching decision, as further set forth below. A decrement loop counter parameter 155 specifies a value (called "DEC_LOOP_CNT" herein) that controls whether the LOOP_CNT[7:0] value is decremented when the DMA transfer that is associated with the DMA descriptor 100 completes. Thus, for example, the last DMA descriptor 100-N of the DMA descriptor execution path 170 may cause the DMA engine 152 to decrement the LOOP_CNT[7:0] value.

In general, a linking control parameter 158 (having a value called "LINK_SEQUENTIAL" herein) controls the DMA engine's linking to the next DMA descriptor 100 after the DMA transfer for the currently executed DMA descriptor 100 completes. In this manner, there are two types of linking that may occur, in accordance with an example embodiment. The first type of linking is sequential linking, which means that next DMA descriptor 100 to be executed resides in the next contiguous DMA descriptor memory location. For example, a set of DMA descriptors 100 may be stored one after another in contiguous memory. Assuming, as an example, a DMA descriptor length of four words, if the LINK_SEQUENTIAL value for the DMA descriptor 100 being currently processed indicates sequential addressing (LINK_SEQUENTIAL=SQTL), then the DMA descriptor engine 152, in general, increments its DMA descriptor memory address pointer from the current base address (of the DMA descriptor 100 being currently executed) by four words after the current DMA transfer completes to derive the address of the next DMA descriptor 100.

The second type of linking is non-sequential linking, which means that a link address parameter 157 (called LINK_ADDRESS [29:0] herein) specifies the memory location of the next DMA descriptor 100 to be executed. When the LINK_SEQUENTIAL value indicates non-sequential addressing (LINK_SEQUENTIAL=LINK), then the LINK_ADDRESS [29:0] value specifies the absolute address for the next word-aligned DMA descriptor 100 to be executed after the current DMA transfer completes.

It is noted that for the first DMA descriptor 100 for the beginning of a given DMA descriptor execution flow, the LINK_SEQUENTIAL value may be programmed to specify either the sequential or non-sequential mode, and the starting address of the DMA descriptor 100 may be programmed into the LINK_ADDRESS [29:0] value of the descriptor 100. Subsequently executed DMA descriptors 100 in this execution flow may specify sequential linking and thus, may use the LINK_ADDRESS [29:0] value by incrementing the LINK_ADDRESS [29:0] value by four and each DMA cycle completes. Additionally, as further described below, the DMA engine 152 may ignore the LINK_ADDRESS [29:0] value when the LOOP_EN value enables looping and a STOP or ELSE branching condition is reached, as signified by the LOOP_CNT[7:0] count value reaching zero.

In accordance with an example embodiment, a link stop parameter 159 (having a value called "LINK_STOP" herein) of the DMA descriptor 100 may be used to selectively enable linking to the next DMA descriptor 100, as defined by the LINK_SEQUENTIAL value, after a current DMA descriptor execution flow completes. In this manner, in accordance with an example embodiment, if LINK_STOP allows linking (LINK_STOP=DIS) after the current execution path completes, then after the current DMA transfer completes, the DMA engine 152 links to the DMA descriptor 100 of the next DMA descriptor execution flow. If, however, at the end of the current DMA execution path one of the following applies, then linking terminates: 1. looping operation is disabled (LOOP_EN=DIS); or 2. looping operation is enabled (LOOP_EN=EN) and the end of the loop has been reached (LOOP_CNT[7:0]=0).

In accordance with an example embodiment, the parameters of the DMA descriptor 100 may be used to control two types of conditional branching when a current DMA descriptor execution loop flow terminates, or ends: a LOOP_STOP branch in which the DMA descriptor 100 execution terminates and the DMA engine 152 transitions to an idle state; and a LOOP_ELSE branch in which the DMA engine 152 begins executing another DMA execution flow.

More specifically, assuming that the DMA engine 152 is executing DMA descriptors 100 in a loop, while the LOOP_CNT[7:0] count value is nonzero, looping continues. When the LOOP_CNT[7:0] count value reaches zero and the LINK_STOP parameter disables linking (LINK_STOP=EN), then the LINK_STOP branch occurs, thereby idling the DMA engine 152. Continuing this example for a loop execution flow, when the LOOP_CNT[7:0] count value reaches zero and the LINK_STOP parameter enables linking (LINK_STOP=DIS), then the DMA engine 152 interprets the LINK_SEQUENTIAL value in an inverse manner to determine the address for the next DMA descriptor 100 of another execution flow. In this manner, if the LINK_SEQUENTIAL value indicates sequential addressing (LINK_SEQUENTIAL=SQTL), then then the LOOP_ELSE decision involves the DMA engine 152 using the LINK_ADDRESS [29:0] value for non-sequential addressing. If the LINK_SEQUENTIAL value indicates non-sequential addressing (LINK_SEQUENTIAL=LINK), then the LOOP_ELSE decision involves the DMA engine 152 ignoring the LINK_ADDRESS [29:0] and accessing the next DMA descriptor 100 in memory.

As a more specific example, the DMA engine 152 may initially process the set of N descriptors 100 (descriptors 100-1, 100-2 . . . 100-N, being depicted in FIG. 3) of FIG. 3 in a DMA descriptor execution flow 170 that forms a loop. In other words, pursuant to the loop, the DMA engine 152 executes the DMA descriptors 100-1 to 100-N to perform associated DMA transfers in the depicted sequence and then, if the LOOP_CNT[7:0] counter value after the processing of the DMA descriptor 100-N is nonzero, the DMA engine 152 proceeds to subsequently process the DMA descriptor 100-1. If, however, after processing the DMA descriptor 100-N the LOOP_CNT[7:0] counter value is zero, the DMA engine 152 makes a branching decision based on the LINK_STOP value, as disclosed above.

In this manner, for the example of FIG. 3, the LINK_STOP value of the DMA descriptor 100-N is disabled (LINK_STOP=DIS), thereby allowing a LOOP_ELSE to another execution flow 172, beginning with exemplary DMA descriptor 100-N+1. For this example, LINK_SEQUEN- TIAL value of DMA descriptor 100-N indicates non-sequential linking, which is used to effect the loop in the DMA descriptor execution flow 172. Therefore, inverting the meaning of the LINK_SEQUENTIAL value for the LOOP_ELSE branch, the DMA engine 152 uses sequential linking to retrieve the DMA descriptor 100-N+1, i.e., the first descriptor of the execution path 172.

It is noted that, as another example, the execution path 170 may have a loop count of one (and thus, be executed once), and for this example, the LINK_SEQUENTIAL value of DMA descriptor 100-N may indicate sequential linking, thereby causing the DMA engine 152 to employ non-sequential addressing (i.e., cause the DMA engine 152 to use the address indicated by the LINK_ADDRESS[29:0] value) at the end of the execution path 170 to acquire the address of the DMA descriptor 100-N+1. Therefore, many embodiments are contemplated, which are within the scope of the appended claims.

Figure 4:
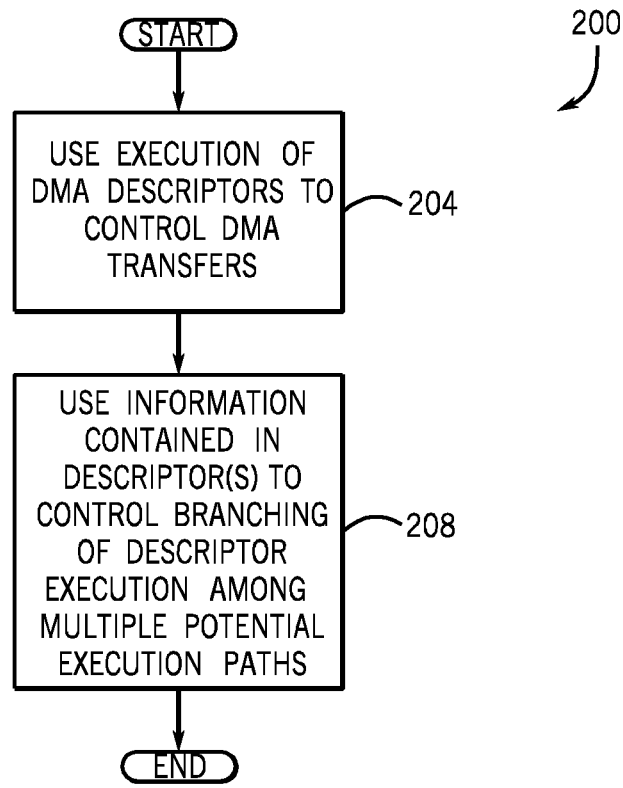
FIG. 4 is a flow diagram depicting a technique to regulate an execution flow for DMA descriptor execution according to an example embodiment.

Thus, referring to FIG. 4, in accordance with example embodiments, a technique 200 includes using execution of descriptors to control DMA channel communications, pursuant to block 204. Data of the descriptors is used, pursuant to block 208, to control the branching of the descriptor execution among multiple execution paths.

Figure 5:
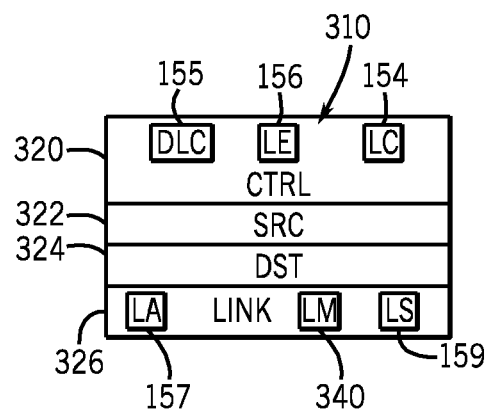
FIG. 5 is an illustration of a DMA descriptor according to an example embodiment.

Other embodiments are contemplated, and are within the scope of appended claims. For example, in accordance with some embodiments, an alternative descriptor 310, which is depicted in FIG. 5, may be used. Similar to the descriptor 100, the descriptor 310 includes control 320, source 322, destination 324 and link 326 fields. However, the control 320 and link 326 contain different parameters for purposes of controlling conditional branching, as set forth below.

In particular, the link sequential parameter 158 of the DMA descriptor 100 is replaced in the DMA descriptor 310 by a link mode parameter 340, which has a value called, "LINK_MODE." Instead of controlling sequential or non-sequential addressing, the LINK_MODE value selects whether relative or absolute addressing for purposes of linking to the next DMA descriptor to be processed, using the LINK_ADDRESS[29:0] value as the base address. The LINK_STOP value may further be used for purposes of controlling conditional branching decisions.

More specifically, assuming that the LOOP_EN values allows (LOOP_EN=EN) a loop-type DMA descriptor execution path, the LINK_MODE value controls linking back to the first DMA descriptor 310 of the loop. However, when the loop ends (when the LOOP_CNT[7:0] count value is zero), the DMA engine 152 ignores the LINK_MODE value and allows the LINK_STOP and LINK_MODE values for this exemplary embodiment control two types of conditional linking: a LOOP_STOP condition when the LINK_STOP value enables (LINK_STOP=EN) the stopping of linking and idling of the DMA engine 152; and a LOOP_ELSE condition when the LINK_STOP value does not stop the linking and the DMA engine 152 ignores the addressing indicated by the LINK_MODE value and instead, uses sequential addressing to load the next sequential DMA descriptor 310. Therefore, the DMA engine 152 uses the LINK_MODE value during normal loop operation to control DMA descriptor linking and ignores the LINK_MODE value when evaluating the LOOP_ELSE branching condition at the conclusion of the loop.

In accordance with an example embodiment, the LINK_MODE value is a read-only value that reflects the last LINK_MODE value retrieved from the last linked DMA descriptor 310, denoting whether the current LINK_ADDRESS[29:0] value is an absolute address or a relative address that is offset from the previous link address. When the LINK_MODE value indicates absolute addressing (LINK_MODE=ABS), then the last link address value retrieved from the last DMA descriptor 310 is an absolute address value, which has been loaded into the LINK_ADDRESS [29:0] value. When the LINK_MODE value indicates relative addressing (LINK_MODE=REL), then the last link address value fetched from a DMA descriptor 310 is a relative address value.

In accordance with an example embodiment, for a linked relative value, the least significant bits (the least significant sixteen bits, for example) of the LINK_ADDRESS [29:0] value is interpreted as a two's compliment number, which indicates the number of quad-words to offset the current descriptor structure's base address. The DMA engine 152 adds the current address and the offset together and stores the result in the LINK_ADDRESS [29:0] field to point to the base address of the next DMA descriptor 310.

The LINK_STOP value, when allowing linking, allows linking to the next DMA execution flow, as defined by the LINK_MODE value after completion of the current DMA transfer. If the LINK_STOP parameter prohibits linking, then if the loop operation is disabled or if it is enabled and the end of the loop has been reached and the LOOP_CNT[7:0] field is zero, then DMA descriptor execution terminates after the current DMA transfer completes.

It is noted for this particular embodiment, the LINK_ADDRESS [29:0] field is ignored when the loop enable parameter is enabled and the STOP or ELSE condition is reached, as signified by the LOOP_CNT[7:0] field being zero.

Figure 6:
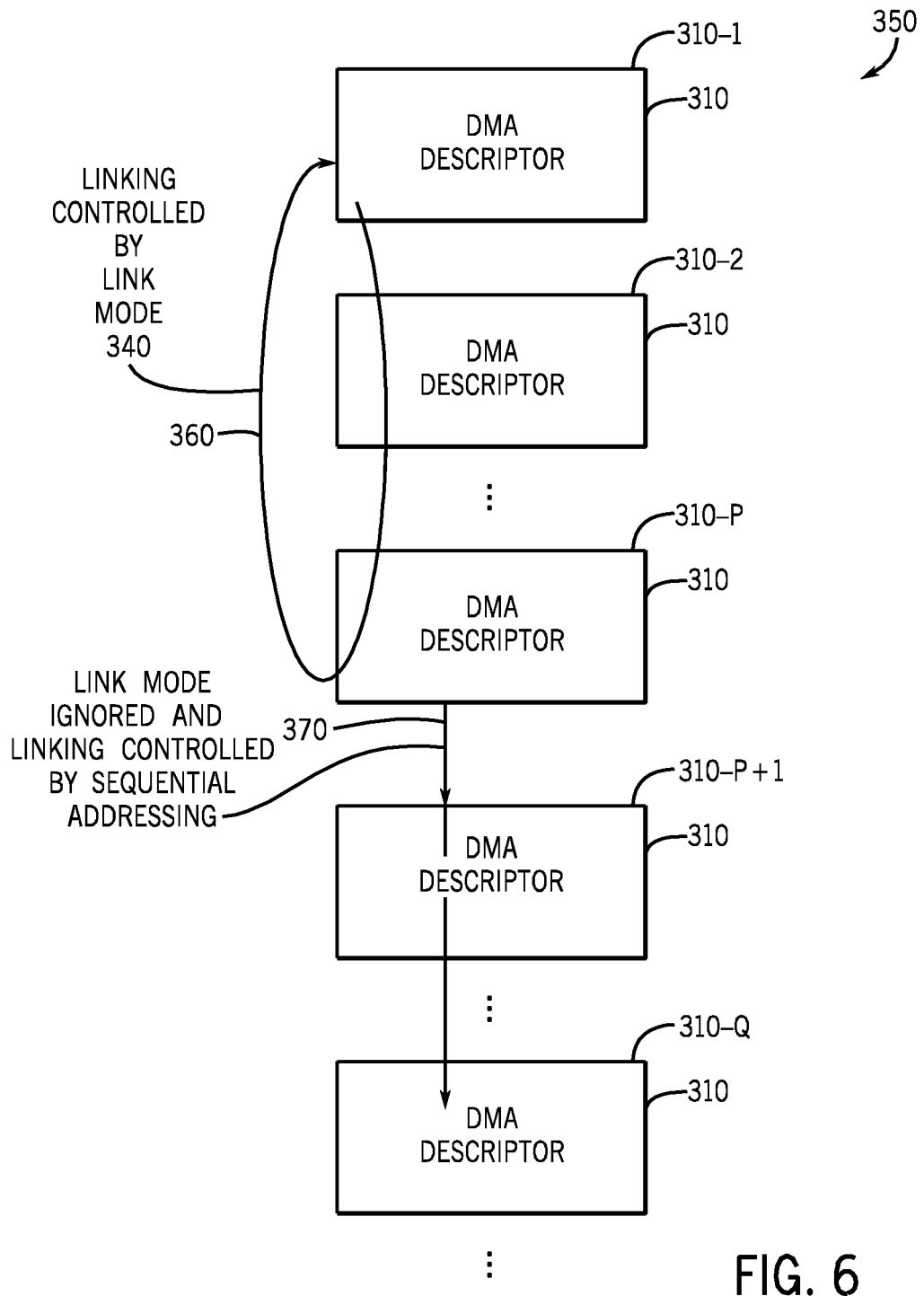

Thus, referring to FIG. 6, in accordance with an example embodiment, the DMA descriptor 310 of FIG. 5 may set forth an example execution flow 350. The example execution flow 350 has two DMA descriptor execution paths 360 and 370. The execution path 360 is controlled by the LINK_MODE value. When transition is made to execution path 370, the LINK_MODE value is ignored and execution defaults to sequential addressing.

Figure 7:
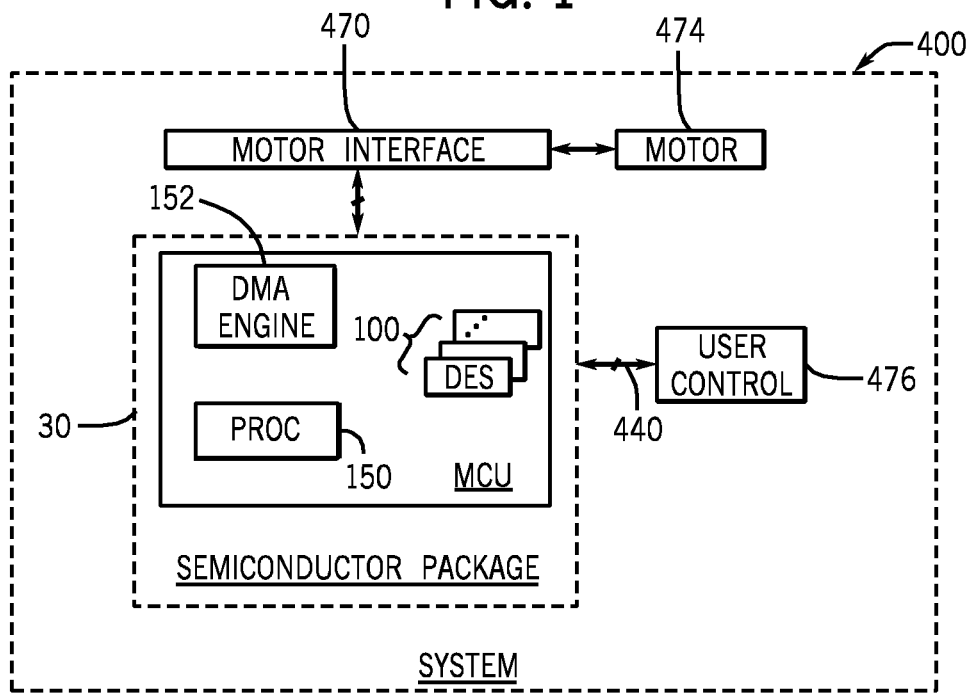

Referring to FIG. 7, in accordance with some embodiments, the MCU 24 may be part of a system 400 to control a motor 474. In this manner, the MCU 24 may generate/receive input and output signals (I/O signals) in connection with the control of a motor interface 370 that generates and receives signals in connection with operating the motor 474. For example, the MCU 24 may generate signals at its I/O terminals 454 for purposes of communicating with drivers, sensors, and so forth of the motor interface 470; and in connection with this communication, I/O terminals 454 of the MCU 24 may communicate waveforms (pulse width modulation (PWM) signals, for example), receive sensed currents and voltages, communicate data via one or more serial buses, and so forth. The MCU 24 may further include, for example, other I/O terminals 440 for purposes of generating/receiving signals to communicate with a user control interface 476 for such purposes as communicating status of the motor 74 and motor interface 470; communicating detected fault conditions; receiving user-directed commands and signals; and so forth.

While a limited number of embodiments have been disclosed herein, those skilled in the art, having the benefit of this disclosure, will appreciate numerous modifications and variations therefrom. It is intended that the appended claims cover all such modifications and variations.

What is claimed is:
1. A method comprising:
using execution of descriptors in a processor-based machine to control direct memory access communications; and using data from a given descriptor of the descriptors to control repeated executions of at least one of the descriptors to control branching of descriptor execution among execution paths, wherein using the data comprises:

using a loop counter to regulate a number of the repeated executions of at least one of the descriptors using a first execution path of the execution paths and using a first interpretation of a linking parameter to define an order in which at least some of the descriptors are executed using the first execution path; and using a second interpretation of the linking parameter to cause the descriptor execution along a second execution path of the execution paths in response to the loop counter indicating expiration of the number of repeated executions.

2. The method of claim 1, wherein using the data comprises using the data to control an if-then-else decision regarding selection of the execution paths.

3. The method of claim 1, wherein using the first interpretation comprises using one of sequential descriptor addressing and linked descriptor addressing, and using the second interpretation comprises using the other one of linked descriptor addressing and sequential descriptor addressing.

4. The method of claim 1, wherein using the data comprises:

using a loop counter to regulate a number of the repeated executions of at least one of the descriptors using a first execution path of the execution paths and using a link mode parameter to control whether relative addressing or absolute addressing is used; and using a predefined addressing to cause the descriptor execution along a second execution path in response to expiration of the number of repeated executions.

5. The method of claim 1, wherein using the predefined addressing comprises using sequential descriptor addressing.

6. An apparatus comprising:

a memory to store descriptors to control direct memory access (DMA) communications; and a control circuit to use data in a given descriptor of the descriptors to control repeated executions of at least one of the descriptors to control branching of descriptor execution among alternative execution paths, wherein the control circuit is adapted to use one of sequential descriptor addressing and non-sequential descriptor addressing and use the other of the sequential addressing and the non-sequential descriptor addressing in response to the expiration of a number of the repeated executions.

7. The apparatus of claim 6, wherein the control circuit is adapted to:

use a loop counter to regulate a number of the repeated executions of at least one of the descriptors using a first execution path of the alternative execution paths—and using a first interpretation of a linking parameter to define an order in which at least some of the descriptors are executed using the first execution path; and use a second interpretation of the linking parameter to cause the descriptor execution along a second execution path of the alternative execution paths in response to the loop counter indicating expiration of the number of repeated executions.

8. The apparatus of claim 6, wherein the control circuit is adapted to:

use a loop counter to regulate a number of the repeated executions of at least one of the descriptors using a first execution path of the alternative execution paths and using a link mode parameter to control whether relative addressing or absolute addressing is used; and use a predefined addressing to cause the descriptor execution along a second execution path in response to expiration of the number of repeated executions.

9. The apparatus of claim 8, wherein the predefined addressing comprises sequential descriptor addressing.

10. An apparatus comprising:

an integrated circuit comprising a processing core and a direct memory access (DMA) engine, wherein the DMA engine is adapted to:

process descriptors to control direct memory access (DMA) communications, the descriptors containing data indicating communication endpoints associated with the DMA communications;

use other data contained in a given descriptor of the descriptors to control repeated executions of at least one of the descriptors to control branching of descriptor execution among alternative execution paths;

use a loop counter to regulate a number of the repeated executions of at least one of the descriptors using a first execution path of the alternative execution paths and using a link mode parameter to control whether relative addressing or absolute addressing is used; and use a predefined addressing to cause the descriptor execution along a second execution path in response to expiration of the number of repeated executions.

11. The apparatus of claim 10, wherein the DMA engine is adapted to:

use a loop counter to regulate a number of the repeated executions of at least one of the descriptors using a first execution path of the alternative execution paths and using a first interpretation of a linking parameter to define an order in which at least some of the descriptors are executed using the first execution path; and use a second interpretation of the linking parameter to cause the descriptor execution along a second execution path of the alternative execution paths in response to the loop counter indication expiration of the number of repeated executions.

12. The apparatus of claim 10, wherein the DMA engine is adapted to use one of sequential descriptor addressing and non-sequential descriptor addressing and use the other of the sequential addressing and the non-sequential descriptor addressing in response to the expiration of the loop counter.

13. The apparatus of claim 10, wherein the DMA descriptors further contain data indicating byte transfer sizes associated with the DMA communications.

14. The apparatus of claim 10, further comprising:

a memory, wherein the processing core and the direct memory access engine are each adapted to independently access the memory.

15. The apparatus of claim 14, wherein at least one of the descriptors is stored in the memory.

16. The apparatus of claim 15, wherein the direct memory access engine is adapted to retrieve the at least one descriptor from the memory.

17. The apparatus of claim 10, wherein the direct memory access engine is adapted to execute the descriptors to control an if-then-else decision regarding selection of the alternative execution paths.

18. A method comprising:

using execution of descriptors in a processor-based machine to control direct memory access communications; and using data from a given descriptor of the descriptors to control branching of descriptor execution among alternative execution paths, wherein using the data comprises:
  using a first interpretation of a linking parameter to define an order in which at least some of the descriptors are executed using a first execution path; and
  using a second interpretation of the linking parameter to cause descriptor execution along a second execution path of the alternative execution paths.

* * * * *